United States Patent [19]

Timmer

[11] 4,293,168

[45] Oct. 6, 1981

[54] HOUSING FOR Y-BEARING

[75] Inventor: Hendrikus J. M. Timmer, Tiel, Netherlands

[73] Assignee: SKF Industrial Trading & Development, B.V., Nieuwegein, Netherlands

[21] Appl. No.: 131,504

[22] Filed: Mar. 18, 1980

Related U.S. Application Data

[62] Division of Ser. No. 814,349, Jul. 11, 1977, Pat. No. 4,213,225.

[30] Foreign Application Priority Data

Jul. 9, 1976 [NL] Netherlands .................. 7607602

[51] Int. Cl.³ .................. F16C 23/04; F16C 23/08; F16C 33/66
[52] U.S. Cl. .................. 308/72; 308/187; 308/194
[58] Field of Search .................. 308/29, 72, 187, 194

[56] References Cited

U.S. PATENT DOCUMENTS

| | | | |
|---|---|---|---|
| 2,695,203 | 11/1954 | Andersen | 308/194 |
| 2,812,224 | 11/1957 | Richmond | 308/194 |
| 3,351,399 | 11/1967 | Gates | 308/187 |
| 3,477,772 | 11/1969 | Anderson et al. | 308/187 |
| 3,552,808 | 1/1971 | Mathers et al. | 308/29 |
| 3,700,298 | 10/1972 | Hay | 308/194 |
| 3,756,675 | 9/1973 | Mangiavacchi | 308/194 |

Primary Examiner—Richard R. Stearns
Attorney, Agent, or Firm—Eugene E. Renz, Jr.

[57] ABSTRACT

A housing for a Y-bearing comprising a plate member having a central aperture split and shaped to define a bearing seat, a radially directed flange spaced axially from the bearing seat and means defining an angular groove in approximately the middle of the bearing seat defining a lubrication channel.

3 Claims, 5 Drawing Figures

HOUSING FOR Y-BEARING

This is a divisional of application Ser. No. 814,349 filed July 11, 1977, now Pat. No. 4,213,225.

BACKGROUND AND SUMMARY OF THE INVENTION

The invention relates to a process for the production of shaped articles using splitting techniques, known per se, in particular to the production of concentric supporting or bearing surfaces as components of articles. The supporting or bearing surfaces are made by splitting the edge portions of a plate-like intermediate product and then forming them to the desired configuration of the supporting or bearing surface without removal of metal, after which the rest of the plate is formed by flanging and/or division to a support means for the mounting, if desired so as to be movable, of the supporting or bearing surface in the article.

Splitting techniques in which an edge portion of a plate-like article is split and then shaped without removal of metal are, for example, disclosed in U.S. Pat. Nos. 3,540,395 and 3,758,930. The present invention is based on the appreciation that by appropriate adaptation of the rest of the plate-like intermediate product the construction of various articles in which supporting or bearing surfaces are present can be considerably simplified, both because the number of component parts of the article can be reduced, and because complicated centering procedures are eliminated.

Thus, using the process of the invention it is possible to make a rolling bearing, in particular for a castor with an upper fixing plate and a swivelling fork which carries the wheel. In accordance with the invention, the outer race of the bearing is produced by splitting the edge of a central aperture in a plate and then calibrating to the dimensions of the rolling elements applied in the bearing, the remainder of the plate being formed by forcing to a dish with an edge portion located in a plane surface, the said dish being closable by a flat cover having features concerning mounting and lubrication. The dish forms a space for the accommodation of a lubricating grease chamber, and, in a further embodiment of the invention, the inner bearing race is produced by forcing the upper part of the material of the swivelling fork, so that apart from one or two covers and plugs, which may be made from plastics, the castor has only two elements, namely the outer bearing race with top plate and the inner bearing race produced in one piece with the fork.

Another suitable application of the process of the invention is the production of the housing of an "Y-bearing", which housing has a bearing seat for the outer race of the Y-bearing. In accordance with the invention, the bearing seat is made by splitting the edge portion of an aperture in a plate, the said edge portion then being formed without removal of metal to a bearing seat of the desired concave configuration. The bearing housing of the invention is light and strong, since at the position of the maximum bearing load the bearing seat is fully supported by the completely undivided plate material. In a further embodiment of the invention, the plate material may be split rather more deeply than is strictly necessary for the formation of the bearing seat, such that during the subsequent forming without removal of metal an annular groove is left in the middle of the bearing seat which can function as a circumferential lubrication channel.

BRIEF DESCRIPTION OF THE DRAWINGS

Embodiments of articles produced by the process according to the invention will now be described with reference to the drawings.

DESCRIPTION OF THE PREFERRED EMBODIMENTS

Figure 1:
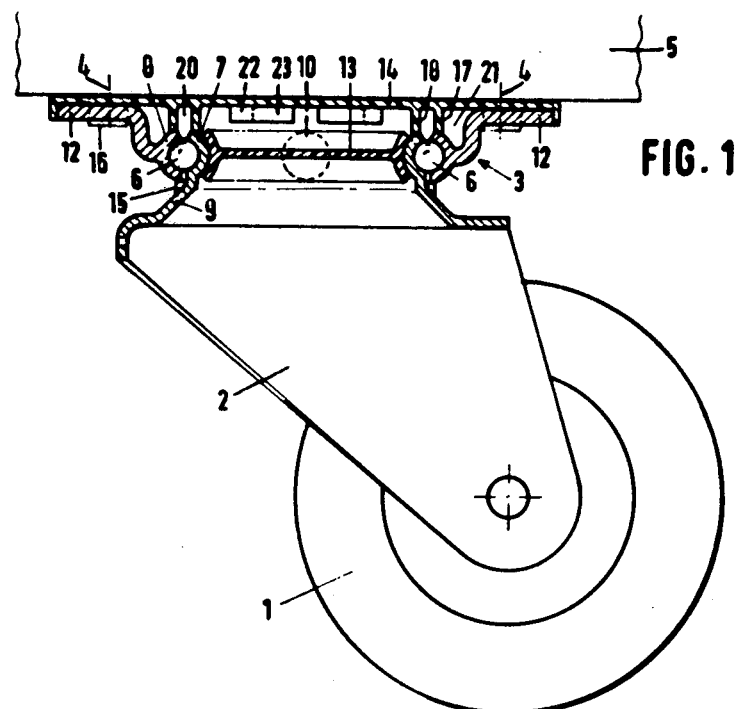
FIG. 1 is a schematic representation of a castor, partly in sectional and in side view.
Figure 2:
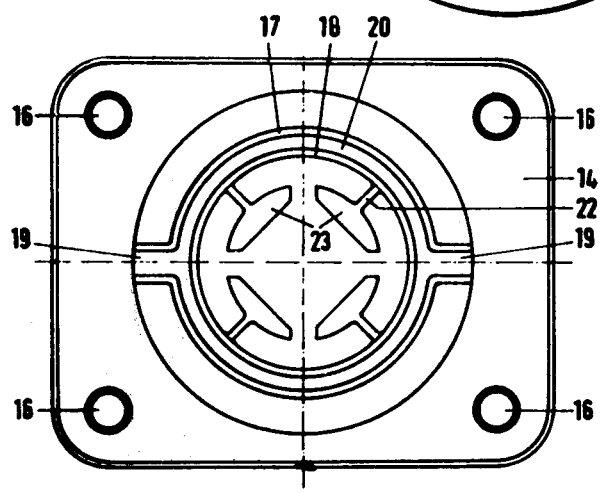
FIG. 2 is a view from below the cover as applied for fixing the castor to a mobile device.

According to the drawings, in particular FIGS. 1 and 2, a castor 1 is mounted in fork 2 which is mounted beneath a mobile device 5 via a rolling bearing arrangement 3 and connected by screws 4. Balls 6 of the rolling bearing are locked between inner and outer bearing races 7 and 8. The inner race 7 is produced by rolling the tubular upper end 9 of fork 2 or in general by forcing without removal of metal. An aperture which is closed by a plug 10, made e.g. of plastics, is located in inner race 7 and serves for inserting balls 6 of rolling bearing 3.

The outer race 8 is made by first splitting the edge of the aperture of a generally rectangular plate provided with a central aperture and then forming to the desired configuration of the race. The part of the plate located outside race 8 is then flanged so that race 8 is radially spaced apart from an edge flange 12 with holes for the passage of screws 4 (shown schematically). The castor structure of FIGS. 1 and 2 is completed by a plastics closure 13 which is held in place by snap action, a cover 14 and a dust-seal 15.

For a more detailed description of cover 14, which is preferably made of plastic, e.g. nylon, reference is made to FIG. 2, according to which the cover 14, comprises four tubular projections 16 which fit into holes for the passage of fixing screws 4 (not shown in detail). These projections 16 ensure centering of the cover in relation to bearing 3 as long as the bearing is not mounted on a mobile device 5. By using e.g. nylon projections 16, which are somewhat longer than the passage for screws 4 these projections function as lock-nuts ("Nylon nuts") during mounting of the rolling bearing and guarantee "locking" between castor and device 5.

The lower side of cover 14 also comprises two concentric rims 17 and 18. Rim 18 is circumferentially continuous while rim 17 is interrupted by one or more gaps 19. Rims 17 and 18 enclose an annular channel 20, which when the cover is mounted opens on the lower side between inner and outer races 7 and 8 of the rolling bearing, so that lubricant can be supplied to balls 7 via annular channel 20 from an annular lubricant reservoir 21. This reservoir on the upper face is limited by cover 14, on the radially inner face by rim 17 and on the radially outer face by the curved wall section connecting outer race 8 with edge flange 12. Reservoir 21 communicates with annular channel 20 via gaps 19 and can be filled by a nipple (not shown).

In the centre of cover 14 four projections 22 are formed with straight bounding surfaces 23 on their radially inner ends so that they define a rectangular space. Within this space, cover 14 may be perforated for the location of a lock-nut by means of which the castor can be fixed in any position.

By choosing a suitable type of steel for the plate material in which the inner and outer races 7 and 8 are formed these races may be hardened.

Figure 3:
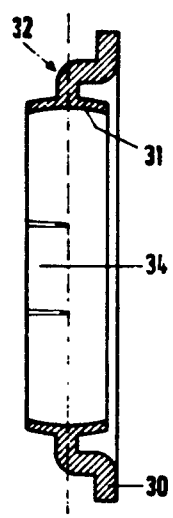
FIG. 3 is a sectional view of the housing of an Y-bearing.
Figure 4:
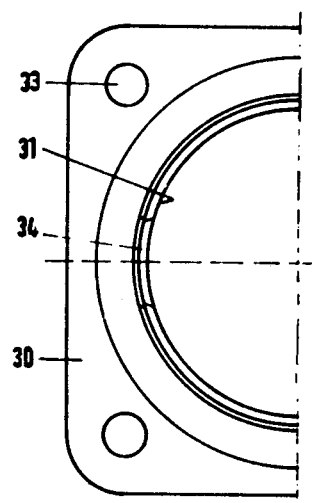
FIG. 4 is a view from above the housing of the Y-bearing according to FIG. 3.
Figure 5:
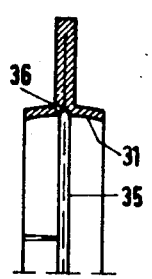
FIG. 5 is a sectional view of an improved detail of the housing as shown in FIG. 3.

FIGS. 3, 4 and 5 show the housing of a Y-bearing. Until now, such housings have been made of cast iron or aluminium and also of steel plate in a two or more part construction. With a casting the bearing seat must be accurately machined to give a good fit to the outer race of the bearing. With steel plate constructions two halves, each with a spherical bearing chamber, are generally used to produce the desired spherical bearing seat. The divided construction is less suitable for heavy loads.

According to the invention, an accurately centered and finished seating surface in a bearing housing may be obtained by relatively simple operations using splitting techniques, which is known per se. The starting material is a piece of steel plate 30 with a central aperture. The edge of the aperture is split and then formed without removal of metal to give an undivided bearing seating 31. By flanging the plate material all round the seating 31 a flange connected to bearing seating 31 by a curved portion 32 is obtained. Fixing holes 33 are made in the flanges. For mounting the outer race of a bearing in the housing, the bearing seating 31 is widened in two diametrically opposite positions as at 34 over half the width of the bearing seating to the maximum external diameter of the bearing to be mounted.

Such bearing housings are light and strong, since at the position of the maximum bearing load the seating ring 31 is completely supported by the completely undivided plate material. Seating ring 31 is accurately circular and the bearing is suitable for radial and axial loads. The bearing may be mass-produced in many external forms.

A circumferential lubricating groove 35 may be readily provided in seating 31. To this end the plate material may, according to the invention, be split somewhat more deeply than is necessary for forming seating 31 such that in the subsequent forming without removal of metal an annular groove 35 is left in the middle of the bearing seating. The annular groove 35 then can be used as a circumferential lubrication channel and fed via a drill hole 36.

I claim:

1. A housing for a Y-bearing comprising a plate member having a central aperture split and shaped to define a bearing seat, a radially directed flange spaced axially from the bearing seat and means defining an annular groove in approximately the middle of the bearing seat defining a lubrication channel.

2. A housing as claimed in claim 1 wherein said bearing seat is widened at two diametrically opposed locations over half the width of the bearing seat to the maximum external diameter of the bearing to be mounted.

3. A housing as claimed in claim 2 including means for securing the flange to another member.

* * * * *